United States Patent
Inoue et al.

(10) Patent No.: US 7,607,157 B1
(45) Date of Patent: *Oct. 20, 2009

(54) NEAR VIDEO-ON-DEMAND SIGNAL RECEIVER

(75) Inventors: Hajime Inoue, Chiba (JP); Yukio Kubota, Kanagawa (JP); Toshimichi Nagashima, Kanagawa (JP); Akira Shimazu, Kanagawa (JP); Keiji Kanota, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/430,950

(22) Filed: Nov. 1, 1999

Related U.S. Application Data

(60) Continuation of application No. 08/840,199, filed on Apr. 11, 1997, now Pat. No. 5,990,881, which is a division of application No. 08/520,564, filed on Aug. 28, 1995, now Pat. No. 5,729,280.

(30) Foreign Application Priority Data

Aug. 31, 1994 (JP) ................................. 06-230281
Oct. 14, 1994 (JP) ................................. 06-275936

(51) Int. Cl.
*H04N 7/173* (2006.01)
*H04N 5/91* (2006.01)

(52) U.S. Cl. ........................ 725/102; 386/66
(58) Field of Classification Search .................. 725/88, 725/89, 93, 94, 101, 100, 102
See application file for complete search history.

(56) References Cited

U.S. PATENT DOCUMENTS

| | | | | |
|---|---|---|---|---|
| 4,949,187 A | * | 8/1990 | Cohen ........................ | 386/69 |
| 5,168,353 A | * | 12/1992 | Walker et al. ................ | 725/103 |
| 5,357,276 A | * | 10/1994 | Banker et al. ................ | 725/102 |
| 5,371,532 A | * | 12/1994 | Gelman et al. ................ | 725/88 |
| 5,414,455 A | * | 5/1995 | Hooper et al. ................ | 725/88 |
| 5,442,390 A | * | 8/1995 | Hooper et al. ................ | 725/90 |
| 5,446,490 A | * | 8/1995 | Blahut et al. ................ | 725/97 |
| 5,453,779 A | * | 9/1995 | Dan et al. ................ | 725/88 |
| 5,477,263 A | * | 12/1995 | O'Callaghan et al. ....... | 725/102 |
| 5,530,754 A | * | 6/1996 | Garfinkle ........................ | 725/8 |
| 5,583,561 A | * | 12/1996 | Baker et al. ................ | 725/93 |
| 5,583,937 A | * | 12/1996 | Ullrich et al. ................ | 380/211 |
| 5,592,551 A | * | 1/1997 | Lett et al. ................ | 380/211 |
| 5,606,359 A | * | 2/1997 | Youden et al. ................ | 725/88 |

(Continued)

FOREIGN PATENT DOCUMENTS

EP 0 562 186 9/1993

(Continued)

*Primary Examiner*—James Sheleheda
(74) *Attorney, Agent, or Firm*—Frommer Lawrence & Haug LLP; WIlliam S. Frommer; Thomas F. Presson

(57) ABSTRACT

A video signal receiver receives a plurality of video channels simultaneously carrying, offset by a transmission interval, a single video program, selects one channel from which to obtain the program for display to a user, and achieves a pause function in the display of the transmitted video program by temporarily storing a segment of the video program equal to the length of the transmission interval and obtaining the remainder of the program at a later time from the same or another channel.

27 Claims, 7 Drawing Sheets

U.S. PATENT DOCUMENTS

| | | | |
|---|---|---|---|
| 5,629,978 A * | 5/1997 | Blumhardt et al. | 370/271 |
| 5,689,298 A * | 11/1997 | Nishimura et al. | 725/88 |
| 5,720,037 A * | 2/1998 | Biliris et al. | 725/92 |
| 5,721,829 A * | 2/1998 | Dunn et al. | 725/87 |
| 5,815,146 A * | 9/1998 | Youden et al. | 715/720 |
| 5,847,750 A * | 12/1998 | Srivastava et al. | 725/102 |
| 5,899,582 A * | 5/1999 | DuLac | 386/125 |
| 5,930,444 A * | 7/1999 | Camhi et al. | 386/46 |
| 5,990,881 A * | 11/1999 | Inoue et al. | 715/720 |
| 6,434,748 B1 * | 8/2002 | Shen et al. | 725/89 |
| 6,553,178 B2 * | 4/2003 | Abecassis | 386/83 |

FOREIGN PATENT DOCUMENTS

| | | | |
|---|---|---|---|
| WO | WO 91 03112 | | 3/1971 |
| WO | WO 91/03112 | * | 3/1991 |

* cited by examiner

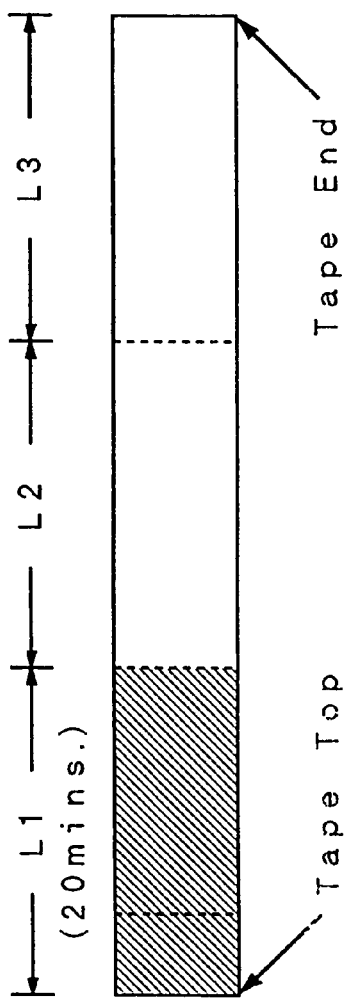
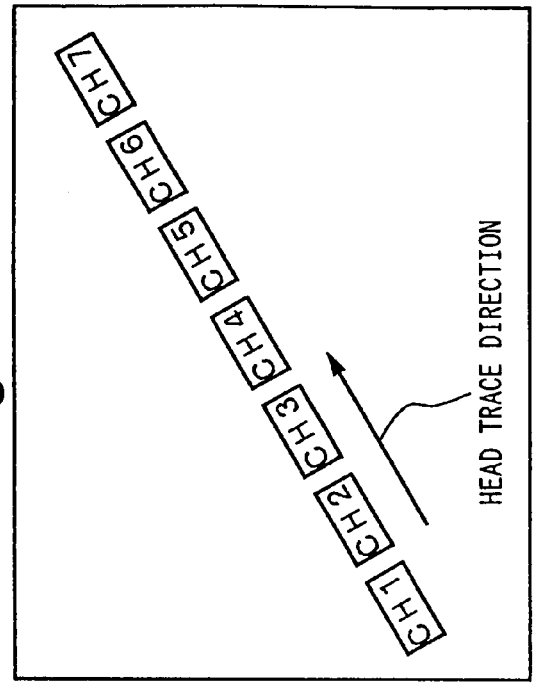

NEAR VIDEO-ON-DEMAND SIGNAL RECEIVER

This is a continuation of application Ser. No. 08/840,199, filed Apr. 11, 1997, now U.S. Pat. No. 5,990,881, which is a division of application Ser. No. 08/520,564 filed on Aug. 28, 1995, now U.S. Pat. No. 5,729,280.

BACKGROUND OF THE INVENTION

This invention relates to a video signal receiver for a near video-on-demand broadcast system.

Commonly, video programming has been provided to consumers through fundamentally different distribution systems. In one, video programs are recorded on individual video cassette tapes (or video discs) which are sold or rented to consumers. Conveniently, the consumer may view the recorded video program at the time of his choosing and may pause (or temporarily halt) reproduction of the video program at any time for an arbitrary length of time. However, a major disadvantage of this system is that the distributor lacks effective control over the dissemination of the video cassette tape or disc to other consumers by secondary sale of the cassette tape or disc or by copying of the video program to another cassette tape. Consequently, the distributor is unable to collect a royalty payment for each reproduction of the video program.

In television transmission systems, such as cable television distribution systems, cable operators provide pay-per-view services whereby subscribers may order a specific video program for viewing at its predetermined broadcast time. Typically, the desired program is broadcast one or more times per day and in some systems may be broadcast repetitively at consecutive intervals. After charging the subscriber a given fee, the cable operator activates the subscriber's individually-addressable cable decoder box to decode the ordered programming for ordinary reception and display. Without the benefit of a recording device, the subscriber's viewing of the video program is limited to the specific interval during which the program is broadcast. All too often, the broadcast schedule for the particular program is incompatible with the subscriber's own personal schedule. Further, the subscriber is constrained to view the entire program during one sitting as there is no mechanism for pausing or otherwise interrupting display of the video program. Such a feature is needed to facilitate viewing of a program in discrete intervals and to accommodate interruptions, such as a telephone call, during display of the program.

Introduction of satellite broadcast digital video signal transmission capabilities coupled with efficient data compression techniques has enabled the digital transmission of several video program signals in the same bandwidth as a single broadcast analog video signal. Such technology is incorporated into a "near video-on-demand" service, also called a "time interval transmitting system," in which a single video program is broadcast on multiple channels with a short interval between the starting time of each program broadcast. For example, a two-hour movie may be broadcast on seven consecutive channels with the starting broadcast time of each channel offset by fifteen minutes from that of a neighboring channel, such that the beginning of the movie is effectively available on one of the channels once every fifteen minutes. Thus, by transmitting the same program at predetermined intervals on a plurality of channels, the maximum time a subscriber will wait between ordering and viewing a pre-scheduled broadcast video program will be equal to the broadcast interval between channels. By definition, this broadcast interval is much shorter than the period between consecutive broadcasts of a program on a single channel of a pay-per-view system.

Further, a near video-on-demand service can utilize other data compression techniques to reduce the time required to transmit a video program to a fraction of the actual running time of the program. By reducing the transmission time of a program, fewer channels can be used to transmit the program at consecutive intervals and/or the transmission interval between channels can be reduced.

However, the near video-on-demand system still suffers the drawback of not providing a "pause" function which allows the viewer to interrupt display of the video program for a period of time. As an awkward alternative, it is contemplated that a viewer could attempt to manually implement a pause-type function after a viewing interruption by scanning other channels carrying the program for a segment of the program which the viewer remembers as preceding the interruption. Assuming proper channel selection, the amount of program that will necessarily be viewed twice (i.e., the overlap) will depend upon the duration of the viewing interruption but will not be greater than the interval between broadcasts. Clearly, such a solution is less than optimal.

Another deficiency of the near video-on-demand system is the variable delay between a subscriber's ordering of a program and the availability of that program for viewing. Similar to the above, the variable delay will be no greater than the broadcast interval. Certainly, the inherent delay makes such a system less convenient than a video-on-demand system which displays the desired video programming immediately.

OBJECTS AND SUMMARY OF THE INVENTION

An object of the present invention is to provide a near video-on-demand signal receiver which receives video signals from a time interval transmitting system but immediately supplies the desired video program for display, much like a video-on-demand signal receiver.

Another object of the present invention is to provide a near video-on-demand signal receiver for selecting from among channels carrying a video program at predetermined intervals the channel on which a specified segment of the program has already been transmitted.

Yet another object of the present invention is to provide a near video-on-demand signal receiver for buffering the display of video signals transmitted by a broadcaster to accommodate the viewing schedule of a user.

Still another object of the present invention is to provide a near video-on-demand signal receiver capable of pausing the display of a video program transmitted by a broadcaster and resuming display of the program from that point without additional delay.

Another object of the present invention is to provide a near video-on-demand signal receiver for displaying previews of several video programs and immediately displaying one of the video programs after selection of the program by a user.

In accordance with an aspect of the present invention a video signal receiver for receiving a plurality of video channels simultaneously carrying a single video program, each transmission of the program on a channel being offset by an interval with respect to the transmission of the program on another channel, is provided. The receiver includes a memory device for storing video signals and for simultaneously receiving video signals for storage and supplying reproduced video signals. The receiver further includes a channel selecting device, coupled to the memory device, which selects one of the video channels and supplies it to the memory device and to a display device. An user input device for receiving commands from a user is included, along with a control device which receives commands from the user input device and generates control signals to control the memory device and the channel selecting device. The channel selecting device supplies a selected channel of video signals to the display device and, in response to a pause command, supplies the selected channel to the memory device. The memory device stores video signals of the selected channel as a stored segment. In response to a resume command, the memory device reproduces the video signals of the stored segment.

The above, and other objects, features and advantages of the present invention will become apparent from the following detailed description of illustrative embodiments when read in conjunction with the accompanying drawings in which the same components are identified by the same reference numerals. In the drawings, arrows are incorporated into the connections between elements to assist in illustrating essential functioning of the invention but do not necessarily indicate unidirectional signal flow.

BRIEF DESCRIPTION OF THE DRAWINGS

FIGS. 6A-6C are schematic diagrams of tape recording formats which are utilized by the signal receiver of FIG. 5.

DETAILED DESCRIPTION OF THE PREFERRED EMBODIMENTS

Figure 1:
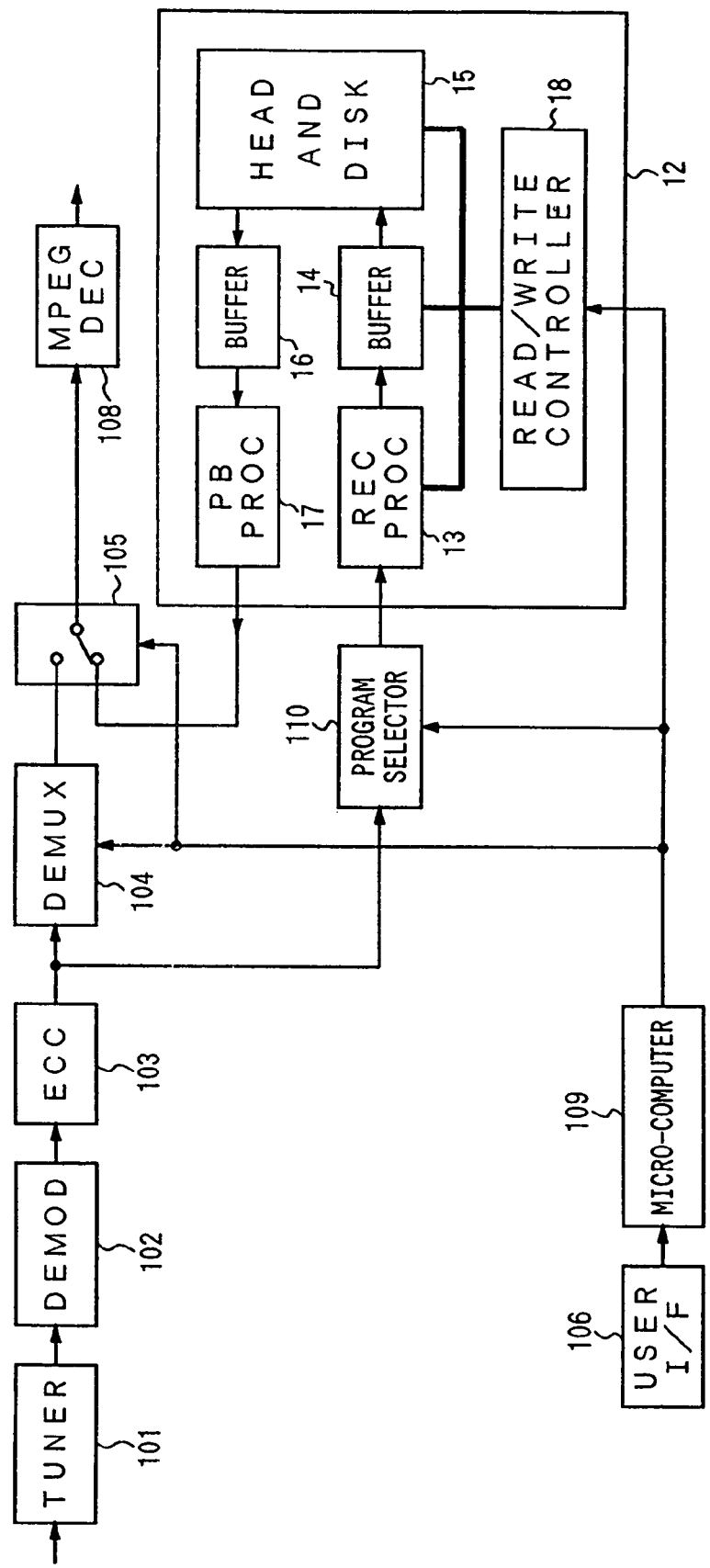
FIG. 1 is a block diagram of a near video-on-demand signal receiver according to one embodiment of the present invention.

In FIG. 1, a near video-on-demand signal receiver according to the present invention is illustrated. The video signal receiver comprises a tuner 101, a demodulator 102, an error correction circuit 103, a demultiplexer 104, a switch 105, a decoder 108, a user interface 106, a microcomputer 109, a program selector 110, and a buffer memory apparatus 12. The receiver receives, decodes, and selectively displays video signals supplied by a broadcaster, utilizing buffer memory apparatus 12 to store certain portions of one or more video programs. By storing a portion of a selected video program, the receiver can display the stored portion of the program while awaiting or receiving transmission from the broadcaster of a subsequent portion of the program.

Tuner 101 receives input digital video signals, selects particular video signals, and supplies the selected signals to demodulator 102. Preferably, input digital video signals are satellite broadcast digital video signals acquired by a satellite antenna (not shown) which is coupled to tuner 101. Alternatively, input digital video signals are supplied from any of a number of other transmission media, such as a land-based broadcast system, a cable television system, a fiber optic network or the like.

Demodulator 102 demodulates the video signals and supplies demodulated signals to error correction circuit 103 which corrects errors introduced during signal transmission. The corrected signals are supplied to program selector 110 and to demultiplexer 104 which, in response to control signals from microcomputer 109, selects one of the corrected signals for supply to an input terminal of switch 105. Similar to demultiplexer 104, program selector 110 selects one of the corrected signals for supply to buffer memory apparatus 12 in response to control signals from microcomputer 109. It is contemplated that program selector 110 may optionally include a separate dedicated control module to reduce the processing load on the microcomputer.

Switch 105, controlled by microcomputer 109, couples one of its two input terminals to its single output terminal which is connected to decoder 108. As is well known in the art, video signals are commonly compressed or otherwise coded to facilitate their transmission through a transmission medium. Decoder 108 decodes such coded digital video signals to produce uncoded digital signals for display on a video display (not shown). It is preferred that decoder 108 is adapted to decode digital video signals encoded in accordance with the Moving Picture Image Coding Experts Group (MPEG) standard.

User interface 106 generates user input signals as a function of input supplied by a user through the interface which may include a keyboard, a mouse, user-operated switches, or the like. The user input signals are supplied to microcomputer 109 to control its operation.

Buffer memory apparatus 12 is preferably comprised of a hard disk drive system, but alternatively may be replaced with a semiconductor memory, a video tape system, a writable optical disk, or the like. As illustrated, buffer memory apparatus 12 includes a recording processor 13, a playback (or reproducing) processor 17, buffer memories 14 and 16, hard disk drive 15, and read/write controller 18. Each of recording processor 13, buffer memory 14, and disk drive 15 are coupled to and controlled by read/write controller 18. Optionally, playback processor 17 and buffer memory 16 are similarly interconnected and controlled.

Preferably, hard disk drive 15 has a conventional structure with typical read and write functions. Nonetheless, a hard disk or other memory device having the ability to simultaneously read and write data (e.g., a hard disk drive with separate read and write heads) can be advantageously utilized in place of a conventional disk drive to reduce the amount of storage capacity required of buffer memories 14 and 16.

Recording processor 13 converts input video signals, supplied through program selector 110, into a suitable data form for recording on the hard disk. In a reverse operation, playback processor 17 converts data reproduced from hard disk 15 into video signals which are supplied to another input terminal of switch 105. Buffer memory 14, interposed between recording processor 13 and disk drive 15, receives and temporarily stores processed data from the processor for supply to the hard disk during write operations. Similarly, buffer memory 16, interposed between disk drive 15 and playback processor 17, temporarily stores reproduced data from the hard disk during read operations for supply to the playback processor. Read/write controller 18 monitors and manipulates the operation of buffer memories 14 and 16 and disk drive 15 to read and write data to the disk on a time-sharing basis while simultaneously receiving data from and supplying data to processors 13 and 17, respectively.

Microcomputer 109, which may be a conventional microprocessor such as that produced by Intel Corporation, or the like, receives user input signals from user interface 106 and generates control signals to control and synchronize the operation of demultiplexer 104, switch 105, program selector 110, and read/write controller 18. As will be described in detail below, microcomputer 109 manipulates these elements of the receiver to seamlessly receive and process for display a transmitted video program and to provide an immediately resumable pause function. Microcomputer 109 may monitor the received video signals through demultiplexer 104 or program selector 110 or through an optional direct connection with error correction circuit 103.

In a first mode of operation, a user enters a request into user interface 106 for the reception and display of a particular video program. For example, the user may select a program from an interactive schedule of programming generated by the microcomputer and displayed on a display. User interface 106 generates user input signals, corresponding to the request, which are supplied to microcomputer 109. Microcomputer 109 controls demultiplexer 104 to select the channel which is next to commence transmission of the requested program. Since each near video-on-demand channel consecutively rebroadcasts the program, the channel which is transmitting the hindmost segment of the program will usually be the next to commence another transmission of the requested program.

As will be appreciated by one of skill in the art, the channel which is next to commence transmission of the requested program may be identified by a variety of conventional methods. For example, an end-of-program signal inserted into the video signals during the hindmost segment of the program may be detected by the microcomputer. Alternatively, the microcomputer may retrieve and compare a time code indicating the elapsed time of the program and embedded in the video signals, to an expected running time of the program. It is contemplated that other similar methods may be implemented with the microcomputer 109.

Tuner 101 receives the video signals of one or more channels carrying the requested program and supplies the signals to demodulator 102. The signals are demodulated by demodulator 102 and subsequently error corrected by error correction circuit 103. Demultiplexer 104 supplies video signals of the channel next to commence transmission of the requested program to an input terminal of switch 105. Microprocessor 105 controls switch 105 to route the signals to decoder 108. Decoder 108 decodes the signals and supplies the decoded signals to a display device (not shown) for ordinary video processing and display to the user. Since the requested program is rebroadcast at predetermined intervals, as described above, the viewer typically will wait a period of time before the requested program can be displayed.

Figures 2A, 2B:
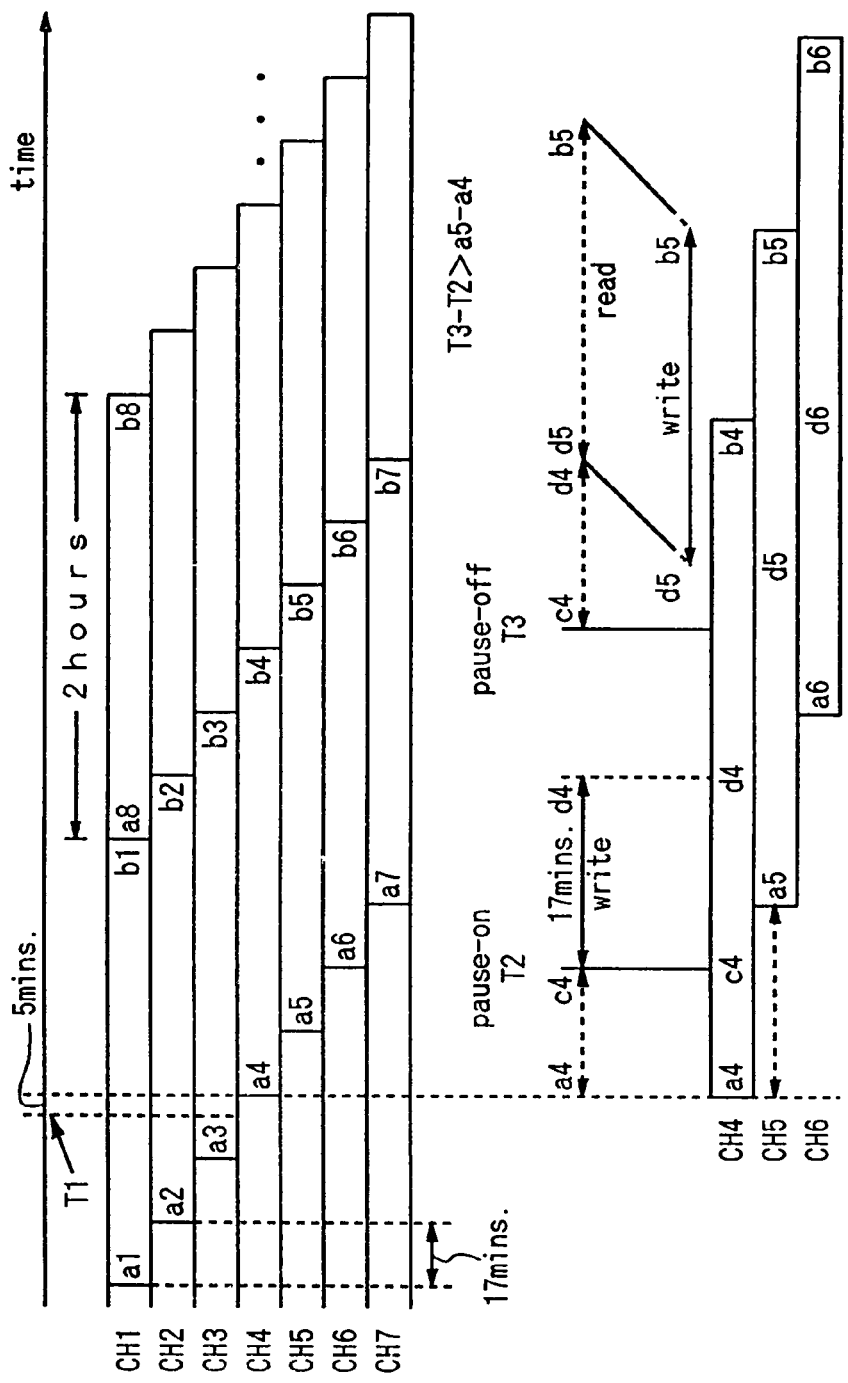
FIGS. 2A and 2B are timing diagrams to which reference will be made in explaining one mode of operation of the signal receiver of FIG. 1.

The pause function of the present invention will be explained in conjunction with FIGS. 2A and 2B which are illustrative timing diagrams of channels in a time interval transmitting system. FIG. 2A illustrates seven channels CH1-CH7 carrying a particular video program having a duration of two hours. The beginning and end of each program transmission is indicated by reference letters "a" and "b", respectively, along with a subscript identifying the particular broadcast segment. Intermediate positions in each program transmission are indicated by reference letters "c," "d" and "e," accompanied by a subscript identifying the particular broadcast segment.

As shown, broadcasting of the program commences once every seventeen minutes and continues consecutively. Thus, a user need wait no more than seventeen minutes for a new broadcast of the program to occur. Correspondingly, hard disk drive 15 has at least enough storage capacity to store seventeen minutes of processed video signals.

FIG. 2B is a magnified illustration of a portion of the timing diagram of FIG. 2A and, therefore, utilizes a different time scale.

Supposing, for example, that a user requests that the program be received and displayed at time $T_1$. As indicated, the time $T_1$ is twelve minutes into the transmission of the program on CH3 and five minutes prior to commencement of transmission of the program on CH4. According to the process described above, the receiver receives and processes for display the program which starts at time $a_4$ on CH4. Reception and processing continues until the user enters a pause command at time $T_2$, corresponding to time $c_4$, into user interface 106 which relays the command to microcomputer 109.

Microcomputer 109 controls program selector 110 to select CH4 for supply to recording processor 13 and causes read/write controller 18 to configure recording processor 13, buffer 14, and disk drive 15 to record (write) the video signals of CH4 on the disk. During the pause, the video program may continue to be displayed, another program may be received and displayed, or a pause graphics screen may be generated by the microcomputer and displayed. Once the duration of recording equals the broadcast interval (e.g., seventeen minutes), microcomputer 109 controls read/write controller 18 to cease at a time $d_4$ the recording of video signals from CH4 on the disk (d−c=17 minutes).

At a later time $T_3$, the user enters a resume command into user interface 106 to end the pause and resume display of the video program. In response to corresponding user input signals generated by user interface 106, microcomputer 109 controls read/write controller 18 to cause hard disk 15 to reproduce (read) data for supply to buffer 16. Additionally, microcomputer 109 controls switch 105 to couple playback processor 17 with decoder 108. Disk drive 15 reproduces from the disk data corresponding to that segment of the program recorded between times $c_4$ and $d_4$. The reproduced data is converted by playback processor 17 into appropriate video signals for supply through switch 105 to decoder 108. As described above, decoder 108 decodes the video signals and outputs the decoded signals for further processing, if necessary, and display.

Simultaneous with the reproduction of the recorded video data, microcomputer 109 and/or program selector 110 selects among CH1-CH7 the channel which will next transmit that segment of the program that occurs (d−a) minutes after commencement of the program (e.g., the video signal at or just before position d in the program). As will be appreciated by one of ordinary skill in the art, the selection of the proper channel can be achieved by a variety of different methods. Two such methods will be described in the following for illustrative purposes.

According to one method, it is presumed that the video signals of each program contain a series of time codes which indicate the elapsed running time of the program. At the time $d_4$, the microcomputer stores a time code retrieved from the video signal at that particular instant. At time $T_3$, microcomputer 109 scans the video signals of CH1-CH7 for the time code nearest but prior to the stored time code. That channel is monitored until a time code equal to the stored time code is detected, at which time program selector 110 is controlled to supply the channel to recording processor 13.

According to another method, it is presumed that the broadcast interval between channels remains a constant value. By considering the constant broadcast interval; the number of channels carrying the program; the arrangement of broadcast intervals among the channels; and times $T_2$, $T_3$, $a_4$, $c_4$ and $d_4$; ordinary arithmetic can be used to determine which channel will be next to transmit the program segment which occurs (d–a) minutes after the beginning of the program. In a similar manner, the period of time before which that segment will be transmitted also can be determined. Microcomputer 109 makes the necessary calculations to determine which channel is next to carry the program segment and the length of time before transmission of the segment will occur. At the time when transmission of the segment is expected, program selector 110 is controlled to supply the channel to recording processor 13.

It is also contemplated that the functioning of the microcomputer 109 in each method could be performed instead by the program selector 110. Regardless of the method, microcomputer 109 controls read/write controller 18 to cause recording processor 13, buffer 14, and disk drive 15 to record the signals supplied from program selector 110. In the present example, CH5 is identified as the next channel to transmit the program segment of interest and the time $d_5$ is identified as the time at which CH5 will carry the program segment.

In sum, starting at time $T_3$ the program segment c to d is read from the hard disk and displayed. Later, starting at time $d_5$, the program segment d to b from CH5 is written to the hard disk. Once the segment c to d has been read from the disk, the disk reads the program segment d to b. Buffers 14 and 16 are used to temporarily store data to accommodate the different data rates inherent in the reception, storage, and reproduction of the video signals. Since the reading of data from and writing of data to the disk requires a finite amount of time, buffers 14 and 16 also temporarily store data to allow time-sharing of the disk-drive 15 between the functions of recording and reproducing data. In this manner, the receiver seamlessly supplies the program segment c to b for display. Thus, display of a broadcast video program can be paused by a viewer and later resumed by the viewer without delay.

As an additional option, when display of the video program is resumed after a pause operation, a short segment of the program immediately preceding the point at which the pause was requested may be first displayed. Display of this short segment serves to refresh the viewer's memory of the preceding portions of the program. This short segment may be stored in buffer 14, buffer 16, on hard disk 15 or in an additional "overlap" buffer. As will be appreciated by one of ordinary skill in the art, this short segment may be stored simultaneous with the segment to be displayed or subsequently specifically sought from among other channels carrying the program.

Figures 3A, 3B:
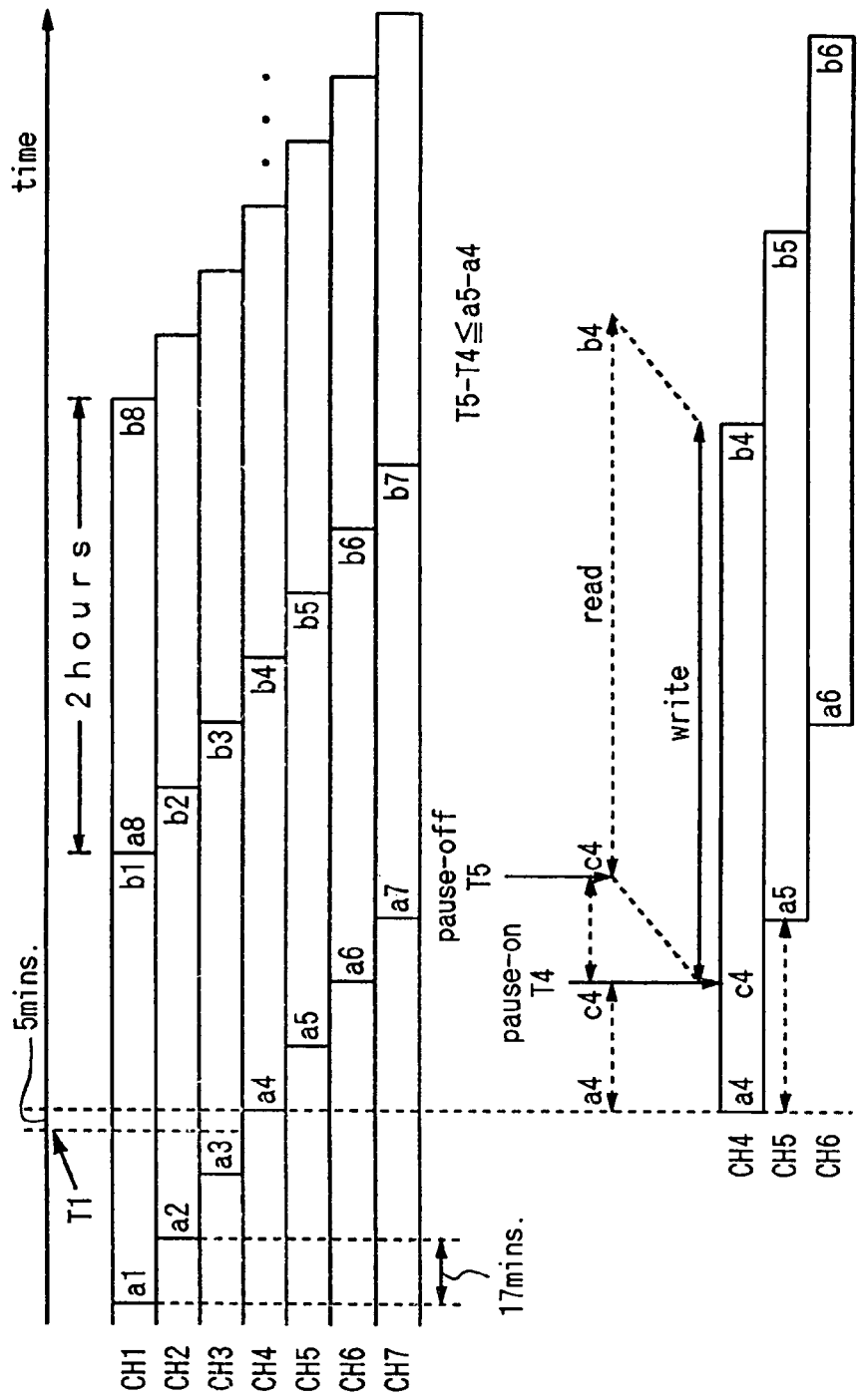
FIGS. 3A and 3B are timing diagrams to which reference will be made in explaining another mode of operation of the signal receiver of FIG. 1.

The simpler situation in which the duration of the pause is less than the broadcast interval is explained in conjunction with FIGS. 3A and 3B. As illustrated, following a user request, video signals from CH4 which start at time $a_4$ are supplied by the receiver for display. At time $T_4$, the user enters a pause command into user interface 106. User interface 106 generates a corresponding user input signal which is supplied to microcomputer 109. Program display is paused, in one of the manners described above, at time $c_4$. At that same time, microcomputer 109 controls program selector 110 to supply the video signals of CH4 to recording processor 13 and controls read/write controller 18 to cause these video signals to be recorded on hard disk 15.

At time $T_5$, the user enters a resume command into user interface 106 to end the pause and resume display of the video program. As illustrated, the period of the pause ($T_5-T_4$) is less than the transmission interval between channels (e.g. $a_5-a_4$). In response to corresponding user input signals generated by user interface 106, microcomputer 109 controls read/write controller 18 to cause disk drive 15 to reproduce (read) data for supply to buffer 16. Additionally, microcomputer 109 controls switch 105 to couple playback processor 17 with decoder 108. Disk drive 15 reproduces from the disk data corresponding to that segment of the program recorded after time $c_4$. The reproduced data is converted by playback processor 17 into appropriate video signals for supply through switch 105 to decoder 108. As described above, decoder 108 decodes the video signals and outputs the decoded signals for further processing, if necessary, and display.

In the meantime, disk drive 15 continues to record (write) data corresponding to the video signals received from CH4. As a result, display of the video program is resumed from position c and continues seamlessly to position b. Thus, buffer memory apparatus serves to delay the display of subsequently received program segments in an amount equal to the period of the pause. Subsequent additional pause operations are processed in the same manner. However, once the sum of the pause periods exceeds the storage capacity of the hard disk, the pause operation is performed as described with respect to FIGS. 2A and 2B.

According to another mode of operation of the present invention, the near video-on-demand signal receiver pre-stores the first segment of a desired video program in the buffer memory apparatus. When a user requests reception and display of the video program, the pre-recorded segment is immediately reproduced and displayed while the receiver scans the channels carrying the program for the remaining segment of the program. Once a transmission of the remaining segment is found, the corresponding video signals are received, stored, reproduced, and displayed in the manner described above to seamlessly present the entire video program to the user.

As will be appreciated, pre-storage of the first segment of a video program may be accomplished by a variety of different methods. For example, the microcomputer may automatically initiate recording of the program segment from a broadcast signal at a predetermined time. Alternatively, the first segment may be supplied to the buffer memory apparatus 12 via a discrete memory device, such as a cartridge, which is removably coupled to the device. As another alternative, a user might direct that one or more initial segments of different programs be prerecorded in anticipation of viewing one of those programs at a later date. Regardless of the exact method utilized, it should be noted that the duration of the prerecorded segment should be at least as long as the broadcasting interval between channels carrying the program in the time interval transmitting system.

Figures 4A, 4B:
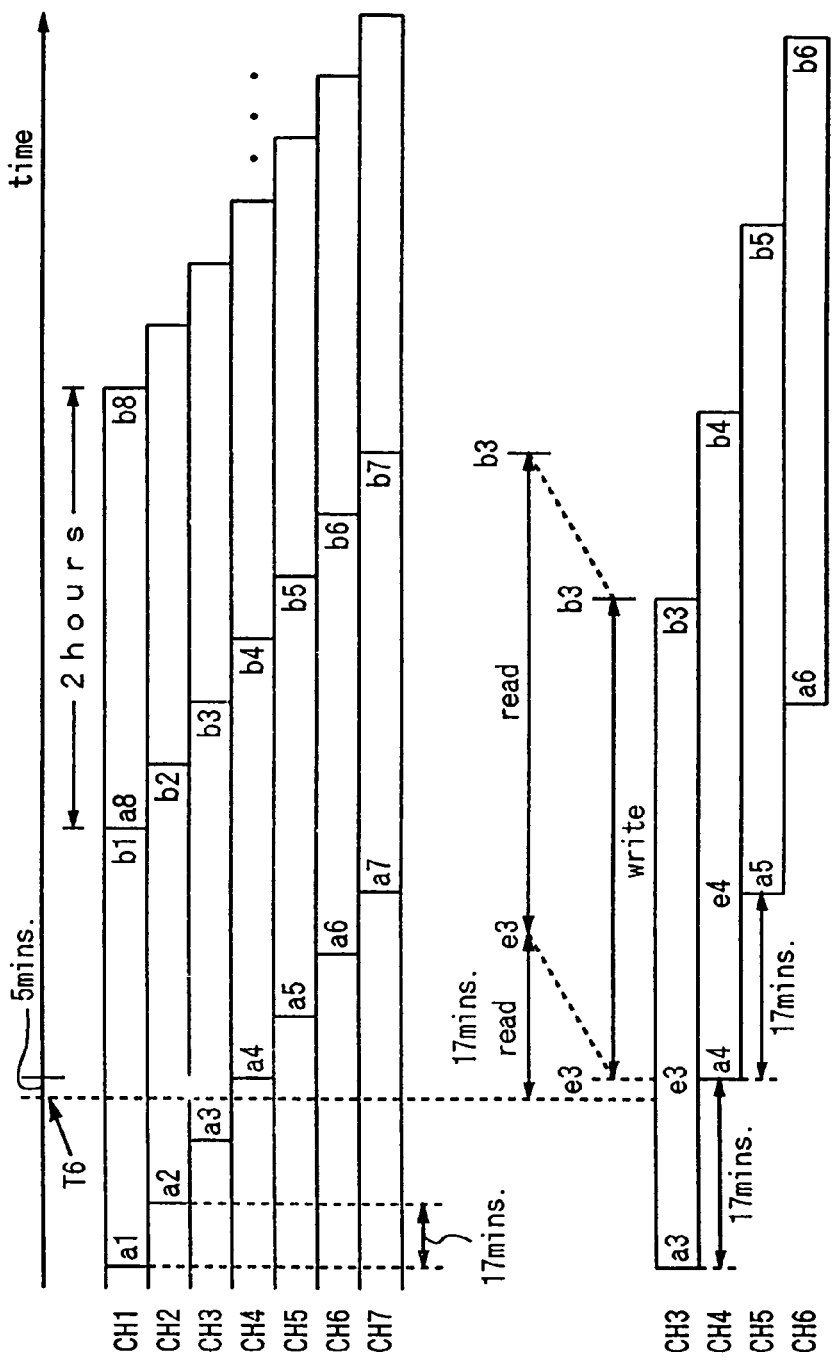
FIGS. 4A and 4B are timing diagrams to which reference will be made in explaining another mode of operation of the signal receiver of FIG. 1.

The provision of a video program immediately upon request by a user with the near video-on-demand receiver of FIG. 1 will be described with reference to FIGS. 4A and 4B. The following explanation assumes that the first segment of the video program, a to e, has been pre-stored in hard disk 15. At time $T_6$, a user requests, through user interface 106, the reception and display of a particular video program. User interface 106 generates user input signals, corresponding to the request, which are supplied to microcomputer 109. Microcomputer 109 controls switch 105 to couple playback processor 17 with decoder 108 and controls read/write controller 18 to cause disk drive 15 to reproduce the prerecorded program segment. As described above, the reproduced data is buffered, converted, processed, and displayed to the user.

At the same time, microcomputer 109 and/or program selector 110 selects among CH1-CH7 for the channel which will next transmit that segment of the program that occurs (e–a) minutes after commencement of the program. Exemplary selection methods have been described in the preceding. As illustrated, CH3 is the next channel to transmit the program segment which starts at position e. At time $e_3$, program selector 110 is controlled to supply video signals carried on CH3 to the recording processor 13. In response to control signals from microcomputer 109, read/write controller 18 causes disk drive 15 to record (write) the input video signals.

Nonetheless, analogous to the operations described above, disk drive 15 continues by reproducing stored video signals while recording video signals received from CH3. Once the pre-stored video signals have been reproduced, the disk drive reproduces the stored data corresponding to the video signals received from CH3. Thus, a seamless display of the entire video program is produced without delay.

In an alternate mode of operation, the hard disk 15 is pre-stored with a number of preview clips of programming available from the near video-on-demand signal provider. The user accesses these preview clips by entering a corresponding command into the user interface 106 which causes microcomputer 109 simply to initiate the reproduction of the data stored on the hard disk. As described above, the preview clips are reproduced and displayed to the user.

Figure 5:
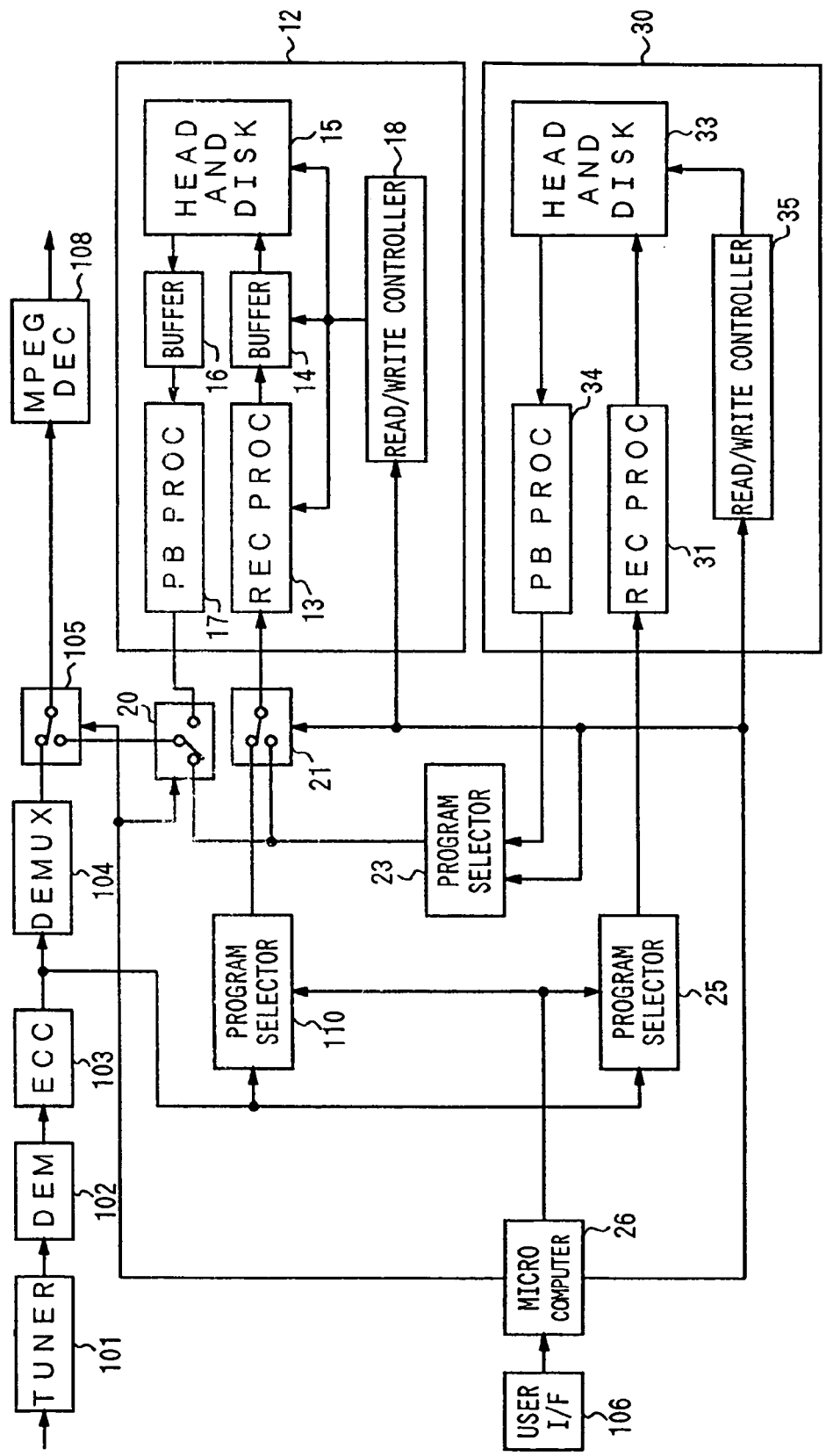
FIG. 5 is a block diagram of a near video-on-demand signal receiver according to another embodiment of the present invention.

A second embodiment of the near video-on-demand receiver according to the present invention is illustrated in FIG. 5. The receiver of the second embodiment includes many of the elements of the receiver of FIG. 1 as previously described, and further includes switches 20 and 21, program selectors 23 and 25, and digital video tape recorder (VTR) 30. Each of these additional elements is coupled to and controlled by a microcomputer 26. Unless otherwise indicated, each element of the receiver coupled to microcomputer 26 is independently controlled by the microcomputer. Tuner 101, demodulator 102, error correction circuit 103, demultiplexer 104, user interface 106, decoder 108, and buffer memory apparatus 12 are configured and operate substantially as previously described above.

VTR 30 is preferably comprised of a digital video tape recording and reproducing system, but alternatively may be replaced with a semiconductor memory, a disk drive system, a writable optical disk, or the like. As illustrated, VTR 30 includes a recording processor 31, a playback (or reproducing) processor 34, a digital video tape recording/reproducing device 33 and read/write controller 35. Recording processor 31 converts input video signals, supplied through program selector 25, into a suitable data form for recording on a video tape. In a reverse operation, playback processor 34 converts data reproduced from the video tape into video signals for supply to program selector 23.

Device 33 is coupled to and controlled by read/write controller 35. Preferably, device 33 has a conventional structure with typical recording and reproducing functions. Read/write controller 35 monitors and controls the operation of device 33 to record data on and reproduce data from the tape. Further, controller 35 receives commands from microcomputer 26 regarding the recording and reproduction of data and may optionally provide status information to the microcomputer regarding the operation of VTR 30.

One input terminal of switch 20 is coupled to the output of playback processor 17 while the other input terminal is coupled to the output of program selector 23. The output terminal of switch 20 is coupled to an input terminal of switch 105. One input terminal of switch 21 is coupled to the output of program selector 110 while the other input terminal is coupled to the output of program selector 23. The output terminal of switch 21 is coupled to the input of recording processor 13.

Program selector 23, in response to control signals from microcomputer 26, selects one set of reproduced signals supplied by playback processor 34 for supply to switches 20 and 21. Program selector 110 and program selector 25, in response to control signals from microcomputer 26, select one channel of corrected signals supplied by error correction circuit 103 for supply to switch 21 and recording processor 31, respectively.

At a predetermined time, or at a time derived from a broadcasting schedule transmitted by a broadcaster, microcomputer 26 controls program selector 25 to select a channel carrying preview information from among the corrected signals supplied by error correction circuit 103 for supply to recording processor 31. Microcomputer 26 additionally controls read/write controller 35 to write processed signals corresponding to the preview information to the video storage tape. Preferably, the preview information comprises a series of previews of available programming and a first segment of each program. In a system that allows a user to select programming after viewing the preview or the like, the length of each first segment should be at least as long as the interval between transmissions of that particular program by the time interval transmitting system. In contrast, in a system that displays the series of previews after selection of the program has been made or the like, the length of each first segment should be at least as long as the difference between the transmission interval between transmissions of the program and the length of the series of previews.

Thereafter, microcomputer 26 controls switch 21 to couple program selector 23 with recording processor 13 and VTR 30 is directed to reproduce the stored previews of available video programs. Buffer memory apparatus 12 is configured to receive and record the stored previews supplied through program selector 23 by VTR 30.

At a later time, a user enters into user interface 106 a preview command. Interface 106 supplies corresponding user input signals to microcomputer 26 which issues control signals to buffer memory apparatus 12, in particular read/write controller 18, to reproduce the stored preview information. Switch 20 is controlled to couple the output of playback processor 17 with an input terminal of switch 105 and switch 105 is controlled to couple switch 20 with decoder 108. In this manner, the previews stored on hard disk 15 are supplied to decoder 108 for decoding and subsequent display to the user.

Prior to or during display of the previews, or at a later time, the user enters into user interface 106 a select command to select one of the previewed programs for display. Interface 106 supplies corresponding user input signals to microcomputer 26 which issues control signals to VTR 30, in particular read/write controller 35, to reproduce the stored segments of video programming. Program selector 23 is controlled to select and supply to switch 20 the reproduced video signals corresponding to the particular video program selected by the user. Switch 20 is controlled to couple the output of program selector 23 with an input terminal of switch 105 and switch 105 is controlled to couple switch 20 with decoder 108. In this manner, the first segment of the desired program stored on the video tape of device 33 is supplied to decoder 108 for decoding and subsequent display to the user.

At the same time, similar to the operation described above with respect to the resume command operation of microcomputer 109, microcomputer 26 and/or program selector 110 selects from the available channels the channel which will next carry the remaining portion of the desired program or, equivalently, the endmost video signal of the first segment of the desired program. Program selector 110 is controlled to select and supply this channel to the input terminal of switch 21. Switch 21 is controlled to couple program selector 110 with recording processor 13. Microcomputer 26 controls read/write controller 18 to cause recording processor 13, buffer 14, and disk drive 15 to record the signals supplied from program selector 110.

Once VTR 30 has completed reproducing the first segment of the desired program, switch 20 is controlled to once again couple playback processor 17 with an input terminal of switch 105. Apparatus 12 is controlled to commence reproduction of the remaining portion of the desired program for supply to decoder 108 through switches 20 and 105. As before, apparatus 12 continues to receive, store and reproduce video signals of the desired program on a time-sharing basis until the entire program has been reproduced for display. As a result, the desired program is displayed in its entirety to the user in a seamless fashion and without delay.

A preferred format for the video tape of device 33 is illustrated in FIGS. 6A-6C. Reference made in the figures and in the following description to specific storage capacities are for illustrative purposes only and are not intended to limit the invention. Additionally, as will be appreciated by one of ordinary skill in the art, other conventional tape format schemes may be implemented to achieve storage of the preview information. In FIG. 6A, the video tape is divided into three segments L1, L2, and L3. Segment L1 is preferably long enough to store twenty minutes of seven channels of video programming (e.g., seven twenty-minute segments of programming multiplexed together on a twenty-minute segment of tape). Segments L2 and L3 are extra storage space and may be used for storing received video signals, storing additional preview information, supplementing the storage capacity of apparatus 12, or like functioning where additional video signal storage is needed. It is contemplated that segments L1, L2 and L3 may be recorded upon and reproduced from at different data rates to accommodate, for example, a slow rate of incoming data. Exemplary techniques for recording such data are described in copending U.S. patent application Ser. Nos. 08/379,620 and 08/358,880.

A preferred format for segment L1 is illustrated in FIG. 6B. Segment L1 is divided into two segments L11 and L12. Segment L11 is preferably long enough to store three minutes of seven channels of video programming while segments L12 stores the remaining 17 minutes of programming. The previews of programs No. 1-7, PRV1-PRV7, are stored in the L11 segment of the tape while the first or top segment of each program, PRG1-PRG7, is stored in segment L12. Preferably, it is segment L11 that is initially transferred to the apparatus 12 for display to the user upon receipt of the preview command.

A preferred tape format for segment L1 is illustrated in FIG. 6C which depicts a multi-track format. One track of the tape is divided into seven tape segments, labeled CH1-CH7, which each contains the corresponding preview and program segment for that channel, e.g. CH1 contains PRV1 and PRG1, CH2 contains PRV2 and PRG2, etc. The format scheme is particularly useful where the data reproduction rate of the VTR is much (e.g. seven times) faster than the rate of the preview and program data.

Figure 7:
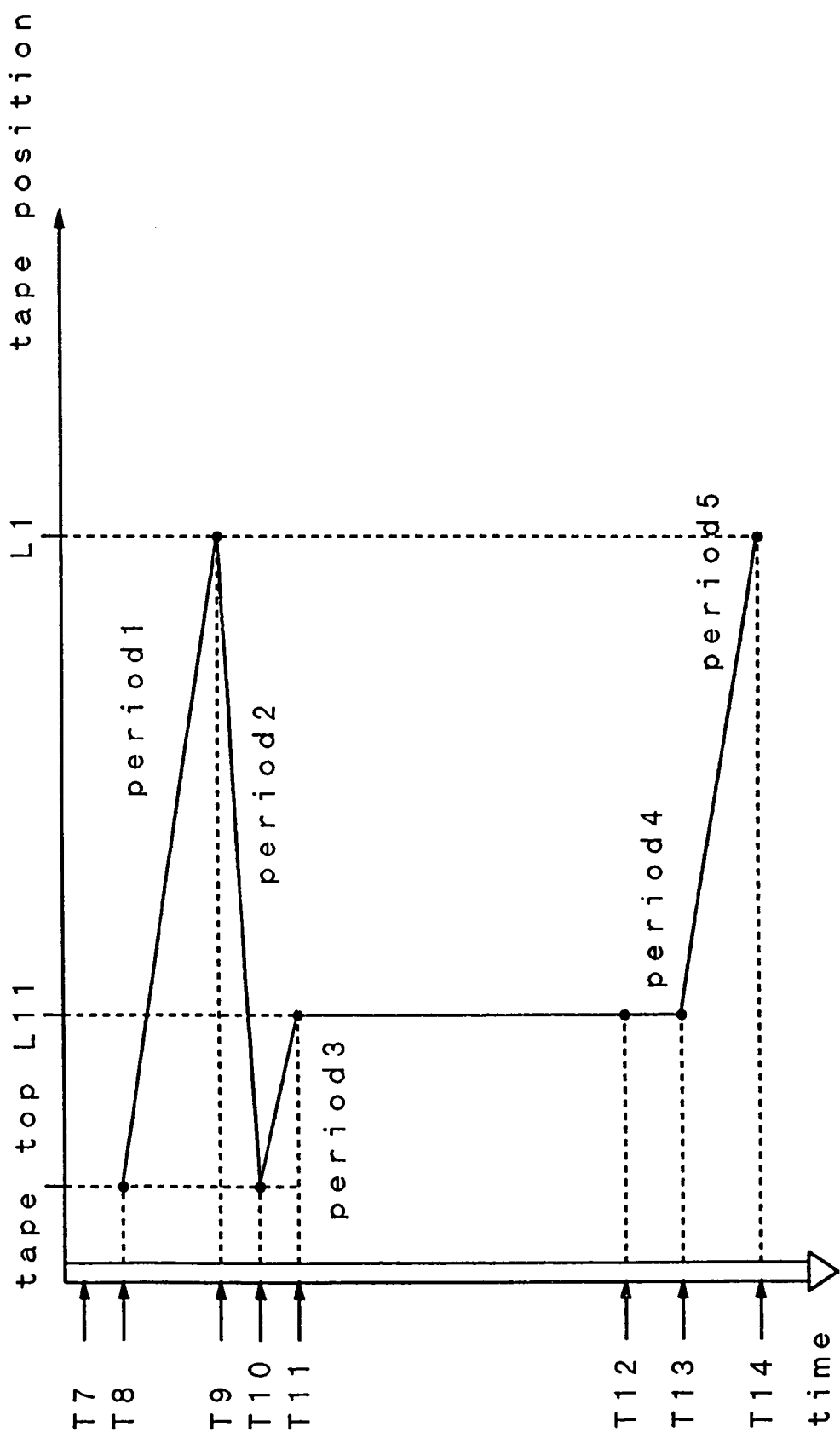
FIG. 7 is a timing diagram to which reference will be made in explaining one mode of operation of the signal receiver of FIG. 5.

FIG. 7 is a tape position vs. time graph summarizing the preferred positioning of the video tape in VTR 30 during the operation of the receiver of FIG. 5. At time T7, the microcomputer 26 is in a standby mode, awaiting the transmission time of the preview information, and the tape is rewound to its beginning (top). At time T8, the microcomputer causes program selector 24 to select and VTR 30 to begin recording the preview information. During period 1, the previews are recorded in segment L11 while the first segments of the video programs are recorded in the remainder of segment L1. At time T9, the recording of preview information is complete and the tape is rewound to its beginning during period 2.

At time T10, the tape is completely rewound and microcomputer 26 configures VTR 30 and buffer memory apparatus 12 for the transfer of the previews from VTR 30 to apparatus 12. During period 3, the previews stored by VTR 30 are reproduced and then recorded on the hard disk by apparatus 12. At the end of period 3, the tape remains at the end of segment L11 which is also the beginning of segment L12.

At time T12, the user enters a preview command which results in the reproduction of the stored previews by apparatus 12 during period 4. At time T13, the user requests viewing of a desired program with a select command. At that time, and throughout period 5, VTR 30 reproduces the first segments of the video programs recorded on the tape. Program selector 23 selects and supplies the first segment of the requested program for display to the user. At that same time, microcomputer 26 coordinates the reception and recording of the remainder of the desired program by apparatus 12.

At time T14, VTR 30 has completed reproduction of the first segment of the desired program and apparatus 12 begins to reproduce the remainder of the program. Until the end of the program is displayed, apparatus 12 continues by reproducing stored portions of the program and by receiving and recording subsequent portions of the program for later reproduction.

It is to be noted that the embodiment of FIG. 5 is also suited to implement the pause and resume functions previously described with respect to FIG. 1. In particular, if a pause command is received during the reproduction of a first segment of the program from VTR 30, operation of the VTR is paused according to conventional techniques. Apparatus 12 proceeds to receive and record a subsequent portion of the video program for a period approximately equal to the transmission interval. When the resume command is entered, the VTR resumes reproduction of the recorded first segment and apparatus 12 continues operation in a manner analogous to that described with respect to FIGS. 2A-2B and 3A-3B, as appropriate.

In the event that the pause command and the resume command are entered during the reproduction of the video program from apparatus 12, operation proceeds as described in FIGS. 2A-2B and 3A-3B, depending on the length of the pause and the amount of buffering storage being provided by hard disk 15.

Although illustrative embodiments of the present invention and modifications thereof have been described in detail herein, it is to be understood that this invention is not limited to these precise embodiments and modifications, and that other modifications and variations may be effected therein by one skilled in the art without departing from the scope and spirit of the invention as defined by the appended claims.

What is claimed is:

1. A method of receiving program information supplied on plural time-offset channels in a near video-on-demand system, comprising the steps of:

storing a segment of the program information supplied on one of said channels in a buffer memory of a receiver in the near video-on-demand system;

selecting a particular channel;

receiving the program information supplied on said particular channel; and reading said stored segment of program information while buffering the program information supplied on said particular channel in response to the selection of said particular channel, wherein reading of said stored segment is paused in response to a pause command while the program information continues buffering, and whereafter reading of said stored segment is resumed in response to a resume command, wherein a second channel, time-offset from said particular channel, is selected to supply the program information if a time difference between the pause command and the resume command is greater than said time-offset, and wherein when display of the program information is resumed after the resume command, an overlap portion is provided.

2. The method of claim 1 wherein said time-offset is equal to the difference between a start-time at which said program information is transmitted on one channel and the start-time at which the same said program information is next transmitted on another channel.

3. The method of claim 2 wherein said program information supplied on said particular channel is buffered by writing said program information into a storage device and reading said program information from said storage device, said reading of said program information commencing after said stored segment of said program information has been substantially fully read, thereby seamlessly reading said program information.

4. The method of claim 2 wherein said stored segment exhibits a time duration substantially equal to the duration of said time offset.

5. The method of claim 2 wherein said one channel over which said segment is supplied and said particular channel over which the buffered program information is supplied are the same.

6. The method of claim 2 wherein the same program information is supplied simultaneously on said plural time-offset channels, and wherein the program information that is supplied on said one channel commencing at the start time of said program information and continuing until said particular channel is selected constitutes said segment that is stored.

7. The method of claim 6 wherein said stored segment of said program information is read out when said one channel is selected as said particular channel.

8. The method of claim 1, wherein said program information is a video program.

9. An apparatus for receiving program information supplied on plural time-offset channels in a near video-on-demand system, comprising:

a storage device for storing a segment of the program information supplied on one of said channels;

a channel selector for selecting a particular channel and for receiving the program information supplied on said particular channel;

a buffer for buffering the program information received on said particular channel in the apparatus; and a read out device for reading out said stored segment of program information while said buffer is buffering said received program information in response to the selection of said particular channel, wherein reading out of said stored segment is paused in response to a pause command while the program information continues buffering, and whereafter reading out of said stored segment is resumed in response to a resume command, wherein a second channel, time-offset from said particular channel, is selected to supply the program information if a time difference between the pause command and the resume command is greater than said time-offset, and wherein when display of the program information is resumed after the resume command, an over lap portion is provided.

10. The apparatus of claim 9, wherein said time-offset is equal to the difference between a start-time at which said program information is transmitted on one channel and the start-time at which the same said program information is next transmitted on another channel.

11. The apparatus of claim 10 wherein said buffer buffers the program information received on said particular channel by writing the received program information into a memory and thereafter reading said received program information from said memory, the received program information being read from said memory once said stored segment of program information has been substantially fully read out from said storage device, thereby seamlessly recovering substantially all of said program information regardless of when said particular channel is selected.

12. The apparatus of claim 11 wherein said buffer includes a hard disk drive.

13. The apparatus of claim 12 wherein said storage device includes said hard disk drive.

14. The apparatus of claim 13 wherein said hard disk drive includes write and read circuits operable at the same time to write to and read from the hard disk drive concurrently.

15. The apparatus of claim 10 wherein said stored segment exhibits a time duration substantially equal to the duration of said time offset.

16. The apparatus of claim 10 wherein said one channel on which said segment is supplied and said particular channel on which said program information is received are the same.

17. The apparatus of claim 10 wherein the same program information is supplied simultaneously on said plural channels, and said segment is formed by storing said program information on one channel commencing at said start time and then, if said particular channel is not selected by the time the start time of said program information on said another channel is reached, replacing the stored segment of program information in said storage device with the program information supplied on said another channel.

18. The apparatus of claim 17 wherein said readout device commences the read out of said stored segment of program information when said particular channel is selected.

19. The apparatus of claim 9 wherein said program information is a video program.

20. A method of receiving program information in a near video-on-demand system, comprising the steps of:

storing a segment of the received program information in a buffer memory of a receiver in the near video-on-demand system; and reading said stored segment of program information while buffering the program information which continues to be received, wherein reading of said stored segment is paused in response to a pause command while the program information continues buffering, and whereafter reading of said stored segment is resumed in response to a resume command, wherein a second channel, time-offset from said particular channel, is selected to supply the program information if a time difference between the pause command and the resume command is greater than said time-offset, and wherein when display of the program information is resumed after the resume command, an overlap portion is provided.

21. The method of claim 20 wherein the received program information is buffered by writing said program information into a storage device and reading said program information from said storage device, said reading of said program information commencing after said stored segment of said program information has been substantially fully read, thereby seamlessly reading said program information.

22. Apparatus for receiving program information in a near video-on-demand system, comprising:
 a storage device for storing a segment of the received program information;
 a buffer for buffering the program information which continues to be received in the apparatus; and
 a read out device for reading out said stored segment of program information while said buffer is buffering said received program information,
 wherein reading out of said stored segment is paused in response to a pause command while the program information continues buffering, and whereafter reading out of said stored segment is resumed in response to a resume command,
 wherein a second channel, time-offset from said particular channel, is selected to supply the program information if a time difference between the pause command and the resume command is greater than said time-offset, and
 wherein when display of the program information is resumed after the resume command, an overlap portion is provided.

23. The apparatus of claim 22 wherein said buffer buffers the received program information by writing the received program information into a memory and thereafter reading said received program information from said memory, the received program information being read from said memory once said stored segment of program information has been substantially fully read out from said storage device, thereby seamlessly recovering substantially all of said program information.

24. The apparatus of claim 23 wherein said buffer includes a hard disk drive.

25. The apparatus of claim 24 wherein said storage device includes said hard disk drive.

26. The apparatus of claim 25 wherein said hard disk drive includes write and read circuits operable at the same time to write to and read from the hard disk drive concurrently.

27. A method of supplying program information in a near video-on-demand system, comprising the steps of:
 providing the same program information on time offset channels, said time offset being the same from channel to channel so that the start time of said program information on one channel differs from the start time of said program information on another channel by said time offset; and
 transmitting said program information simultaneously on a plurality of said time offset channels to a receiving station so as to permit the recording of a segment of the transmitted program information in a buffer of the receiving station commencing from said start time and lasting no more than a predetermined duration that is less than the duration of said program information, and reading the recorded segment of program information while buffering the program information that is transmitted on the same channel as the segment of program information or on any other of said time offset channels,
 wherein reading of said stored segment is paused in response to a pause command while the program information continues buffering, and whereafter reading of said stored segment is resumed in response to a resume command,
 wherein a second channel, time-offset from said particular channel, is selected to supply the program information if a time difference between the pause command and the resume command is greater than said time-offset, and
 wherein when display of the program information is resumed after the resume command, an overlap portion is provided.

\* \* \* \* \*